United States Patent
Yun

[11] Patent Number: 5,982,451
[45] Date of Patent: Nov. 9, 1999

[54] VIDEO SIGNAL LEVEL DETECTOR

[75] Inventor: Hyung-Sik Yun, Seoul, Rep. of Korea

[73] Assignee: LG Semicon Co., Ltd., Chungcheongbuk-Do, Rep. of Korea

[21] Appl. No.: 08/686,426

[22] Filed: Jul. 26, 1996

[30] Foreign Application Priority Data

Jul. 27, 1995 [KR] Rep. of Korea ...................... 95-22542

[51] Int. Cl.$^6$ .................................................. H04N 5/44
[52] U.S. Cl. ........................ 348/571; 348/525; 348/505; 348/533; 348/733
[58] Field of Search ..................... 348/525, 527, 348/532, 534, 731, 732, 733, 726, 728, 671, 678, 695, 691, 505, 506, 507, 508, 509, 571, 533; 358/153, 154, 155, 156; H04N 5/08, 9/45, 5/50, 5/44

[56] References Cited

U.S. PATENT DOCUMENTS

| | | | |
|---|---|---|---|
| 4,543,614 | 9/1985 | Chen et al. | 348/525 |
| 5,157,492 | 10/1992 | Tults et al. | 348/525 |
| 5,701,601 | 12/1997 | Tomoe et al. | 455/226.2 |

FOREIGN PATENT DOCUMENTS 90-189083  7/1990  Japan ............................... H04N 5/44

Primary Examiner—John K. Peng
Assistant Examiner—Wesner Sajous
Attorney, Agent, or Firm—Morgan, Lewis & Bockius LLP

[57] ABSTRACT

A video signal level detector is configured to avoid the erroneous recognition of channels adjacent to normal channels as those which are to be stored during performance of an automatic channel detection and storage function. The video signal level detector separates at least two target signals whose levels are to be detected from an input composite video signal; detects signal levels of the target signals; compares each of the detected levels with a reference voltage level; and logic-operates the result to obtain a final detection so that a storage possibility of automatically detected channels is determined. The video signal level detector includes a signal separator for separating at least two target signals whose levels are to be detected from an input composite video signal; at least two signal level detectors for detecting signal levels of the target signals separated by the signal separator, respectively; at least one comparator installed in each one of the signal level detectors for comparing the signal level of a corresponding one of the target signals with a reference voltage level; and a logic gate for receiving and logic-processing outputs of the comparators.

14 Claims, 1 Drawing Sheet

VIDEO SIGNAL LEVEL DETECTOR

BACKGROUND OF THE INVENTION

1. Field of the Invention

The present invention relates to a video signal level detector and, more particularly, to a video signal level detector for detecting a signal level of an input composite video signal for the purpose of recognizing and storing a receivable television channel.

2. Description of the Related Art

A television (TV) or a video tape recorder (VTR) is a video instrument which may be capable of performing a function of automatically detecting a receivable TV channel or storing the detected channel. To perform the automatic channel detection or storage function, such an instrument is constructed such that if the input signal level is greater than a predetermined value, it is determined that an input signal is receivable, and the input signal is stored.

In a conventional TV having the received channel automatic detection function, during automatic channel detection, adjacent channels may be also recognized to be receivable together with normal channels in an area or geographic location where the reception state is particularly good. In such a case, a user may manually remove the adjacent channels other than the normal channel from the channel storage device. This problem is caused by improved functions of broadcasting wave reception apparatus, tuners, and video signal processing integrated circuit (IC) technology, and by a lowering of the standards for determining selectivity of an input signal in consideration of areas having difficulty in viewing. Another cause of the problem is the comparison of the received level of a composite video signal among the input signals with a reference voltage to detect receivable channels.

SUMMARY OF THE INVENTION

Accordingly, the present invention relates to a video signal level detector that substantially obviates one or more of the problems due to limitations and disadvantages of the related art. It is an object of the present invention to provide a video signal level detector which can detect exactly only the channels having receivable levels by recognizing and storing exactly pertinent channels.

The video signal level detector of the present invention solves a problem of recognizing channels adjacent to normal channels as channels to be stored during performance of an automatic channel detection or a storage function, by separating at least two target signals whose levels are to be detected from an input composite video signal, detecting signal levels of the two detection target signals, respectively, comparing each of the detected levels with a reference voltage level, and logic-operating the result to obtain a final detection so that the storage possibility of automatically detected channels is determined.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawing.

To achieve these and other advantages and in accordance with the purpose of the present invention, as embodied and broadly described, the video signal level detector of the present invention includes: a signal separator for separating at least two target signals whose levels are to be detected from an input composite video signal; at least two signal level detectors for detecting signal levels of the target signals separated by the signal separator, respectively; at least one comparator installed in each one of the signal level detectors for comparing the signal level of a corresponding one of the target signals with a reference voltage level; and a logic gate for receiving and logic-processing outputs of the comparators, wherein a storage setting feasibility of a corresponding channel for the input composite video signal is determined based on an output of the logic gate.

Here, the signals whose levels are to be detected are formed by separating a synchronization signal and a color burst signal from the input composite video signal. The reference voltage level is externally supplied and adjustable.

In another aspect, the video signal level detector according to the present invention is for detecting a signal level of a composite video signal input in order to detect a receivable television channel, and includes: a first level detector for separating a sync signal from the input composite video signal and for generating a first detection signal if a level of the sync signal is greater than a first reference voltage; a second level detector for separating a color burst signal from the input composite video signal and for generating a second detection signal if a peak level of the color burst signal is greater than a second reference voltage; and a logic gate for performing an AND operation with respect to the first detection signal of the first level detector and the second detection signal of the second level detector, and for generating a third detecting signal.

The first level detector includes: a sync separator for separating the sync signal from the input composite video signal; a sync signal level detector for detecting and outputting the level of the sync signal generated by the sync separator; and a first comparator for comparing the sync level signal output by the sync signal level detector with the first reference voltage and for generating the first detection signal if the sync signal level is greater than the first reference voltage.

The second level detector comprises: a color signal separator for separating a color signal from the input composite video signal; a burst gate pulse generator; a color burst signal separator for separating the color burst signal from the color signal; a peak level detector for detecting and outputting the peak level of the color burst signal; and a second comparator for comparing the peak level of the color burst signal output by the peak level detector with the second reference voltage and for generating the second detection signal if the peak level of the color burst signal is greater than the second reference voltage.

The magnitudes of the first and second reference voltages may be adjusted by an external circuit.

In a further aspect, a video signal level detector includes: a first level detector for separating a first signal from an input composite video signal and for generating a first detection signal if a level of the first signal is greater than a first reference voltage; a second level detector for separating a second signal from the input composite video signal and for generating a second detection signal if a level of the second signal is greater than a second reference voltage; and a logic circuit, coupled to the first and second level detectors, for outputting a third detection signal in response to the first and second detection signals, the third detection signal signifying a storage setting feasibility of a channel corresponding to the input composite video signal.

It is to be understood that both the foregoing general description and the following detailed description are exemplary and explanatory and are intended to provide further explanation of the invention as claimed.

BRIEF DESCRIPTION OF DRAWING

The accompanying drawing, which is included to provide a further understanding of the invention and is incorporated in and constitutes a part of this specification, illustrates an embodiment of the invention and, together with the description, serves to explain the principles of the invention. In the drawing.

DETAILED DESCRIPTION OF THE PREFERRED EMBODIMENT

Figure 1:
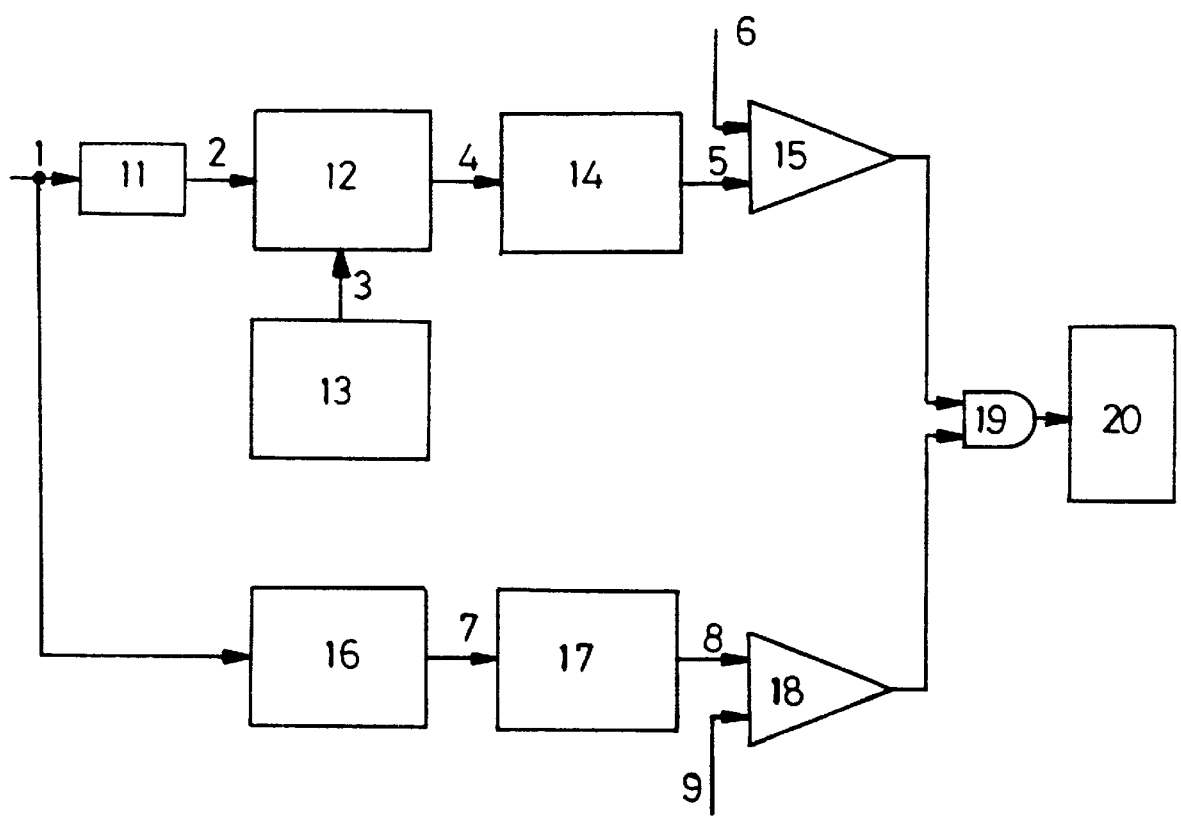
FIG. 1 is a block diagram of a video signal level detector according to the present invention.

Reference will now be made in detail to the preferred embodiment of the present invention, an example of which is illustrated in the accompanying drawing. In this embodiment of the present invention, a sync signal and a color burst signal are target signals to be detected.

The circuit of the present invention includes first and second level detectors and a logic gate.

The first level detector includes a sync separator 16 for receiving a composite video signal 1 composed of a luminance signal, a color signal and a sync signal, and for separating a sync signal 7 therefrom; a sync signal level detector 17 for detecting the level of the sync signal generated by the sync separator 16; and a first comparator 18 for comparing the sync signal level 8 provided by sync signal level detector 17 with a first reference voltage 9, and for generating a first detection signal if the sync signal level 8 is greater than the first reference voltage 9.

The sync signal 7 is separated by the sync separator 16 if the composite video signal 1 is applied. The level of the sync signal 7 is detected by the sync signal level detector 17 to transmit the detected level to a first comparator (that is, first comparator 18) as its input. The first comparator 18, connected at the rear section of the sync signal level detector 17, outputs a low detection signal (0V) if the sync signal level is lower than the first reference voltage, and outputs a high detection signal (5V) if the sync signal level is higher than the first reference voltage.

The second level detector includes a color signal separator 11 for separating a color signal 2 from the input composite video signal 1; a burst gate pulse generator 13; a color burst signal separator 12 for separating a color burst signal 4 from the color signal 2; a peak level detector 14 for detecting the peak level of the color burst signal and for outputting a color burst peak level 5; and a second comparator 15 for comparing the peak level 5 from the peak level detector 14 with a second reference voltage 6, and for generating a second detection signal if the peak level 5 is greater than the second reference voltage 6.

The color signal separator 11 separates the color signal 2 from the composite video signal 1. The color burst signal separator 12 separates the color burst signal using a burst gate pulse 3 from the color signal 2. The peak level detector 14 detects the peak level of the separated color burst signal 4 and applies it to the second comparator 15 as its input. The second comparator 15 outputs a high detection signal (5V) if the color burst peak level 5 is higher than the second reference voltage, and outputs a low detection signal (0V) if the color burst peak level 5 is lower than the second reference voltage.

The logic gate 19 receives the first and second detection signals as two inputs and incorporates an AND gate for outputting a third detection signal from an output port thereof.

The first and second reference voltages are supplied from an external circuit and their magnitudes can be adjusted by manufacture or by user. By adjusting the reference voltage, the reference voltage can be reduced so as to avoid erroneously detecting a neighbor channel. A type of reference voltage generator that can be used for this purpose is well known. For example, a variable resistor can be used as a reference voltage generator. The variable resistor could be connected between power voltages such that the reference voltage is applied from an intermediate terminal of the resistor.

The output of the logic gate 19 is applied to a microcomputer 20 for performing channel setting and storage operations. The microcomputer 20 stores a channel if the output value from the logic (AND) gate 19 is high, and skips or does not store the channel if the output value therefrom is low, so that the signal of the next channel is checked to perform automatic channel detection and storage operations.

In this embodiment, a sync signal and a burst signal are separated from an input composite signal and their levels are detected, respectively. The detected levels are each compared with a reference voltage in a comparator and are output as high or low signals. These outputs are logic-operated to finally determined the storage feasibility of a channel. If both signals are high, the output of the AND gate becomes high, thereby storing the channel. If either signal is low, the channel is too weak to be transmitted, so that the output of the logic gate becomes low, thereby disabling storage of the channel.

As described above, since the video signal level detector according to the present invention uses at least two signals as detecting signals and is constructed so that a user can adjust the reference voltage level as a comparison target of the detecting signals depending on the state of the reception area, the erroneous storage of adjacent channels can be prevented.

It will be apparent to those skilled in the art that various modifications and variations can be made in the video signal level detector of the present invention without departing from the spirit or scope of the invention. Thus, it is intended that the present invention cover the modifications and variations of this invention, provided they come with the scope of the appended claims and their equivalents.

What is claimed is:

1. A video signal level detector for detecting a signal level of a composite video signal input in order to detect a receivable television channel, the video signal level detector comprising:

a first level detector for separating sync signal from the input composite video signal and for generating a first detection signal when a level of the sync signal is greater than a first reference voltage;

a second level detector for separating a color burst signal from the input composite video signal and for generating second detection signal when a peak level of the color burst signal is greater than a second reference voltage; and a logic gate for performing an AND operation with respect to the first detection signal of the first level detector and the second detection signal of the second level detector, and for generating a third detecting signal, wherein the first level detector comprises:
a sync separator for separating the sync signal from the input composite video signal;
a sync signal level detector for detecting and outputting the level of the sync signal generated by the sync separator; and a first comparator for comparing the sync signal level output by the sync signal level detector with the first reference voltage and for generating the first detection signal when the sync signal level is greater than the first reference voltage.

2. A video signal level detector for detecting a signal level of a composite video signal input in order to detect a receivable television channel, the video signal level detector comprising:

a first level detector for separating sync signal from the input composite video signal and for generating a first detection signal when a level of the sync signal is greater than a first reference voltage;

a second level detector for separating a color burst signal from the input composite video signal and for generating second detection signal when a peak level of the color burst signal is greater than a second reference voltage; and a logic gate for performing an AND operation with respect to the first detection signal of the first level detector and the second detection signal of the second level detector, and for generating a third detecting signal, wherein the second level detector comprises:

a color signal separator for separating a color signal from the input composite video signal;

a burst gate pulse generator;

a color burst signal separator for separating the color burst signal from the color signal;

a peak level detector for detecting and outputting the peak level of the color burst signal; and a second comparator for comparing the peak level of the color burst signal output by the peak level detector with the second reference voltage and for generating the second detection signal when the peak level of the color burst signal is greater than the second reference voltage.

3. A video signal level detect for detecting a signal level of a composite video signal input in order to detect a receivable television channel, the video signal level detector comprising:

a first level detector for separating sync signal from the input composite video signal and for generating a first detection signal when a level of the sync signal is greater than a first reference voltage;

a second level detector for separating a color burst signal from the input composite video signal and for generating second detection signal when a peak level of the color burst signal is greater than a second reference voltage; and a logic gate for performing an AND operation with respect to the first detection signal of the first level detector and the second detection signal of the second level detector, and for generating a third detecting signal, wherein magnitudes of the first and second reference voltages are adjustable by at least one external circuit.

4. A video signal level detector comprising:

a signal separator for separating at least two target signals whose levels are to be detected from an input composite video signal;

at least two signal level detectors for detecting signal levels of the target signals separated by the signal separator, respectively;

at least one comparator installed in each one of the signal level detectors for comparing the signal level of a corresponding one of the target signals with a reference voltage level; and a logic gate for receiving and logic-processing outputs of the comparators, wherein a storage setting feasibility of a corresponding channel for the input composite video signal is determined based on an output of the logic gate.

5. A video signal level detector as claimed in claim 4, wherein one of the target signals is a sync signal.

6. A video signal level detector as claimed in claim 4, wherein one of the target signals is a color burst signal.

7. A video signal level detector as claimed in claim 4, further comprising:

a burst gate pulse generator for forming a burst gate pulse used to separate a color burst signal from one of the target signals separated by the signal separator.

8. A video signal level detector as claimed in claim 4, further comprising:

a plurality of external reference voltage level converters which are externally configured so that a user can determine reference voltage levels of the comparators.

9. A video signal level detector comprising:

a first level detector for separating a first signal from an input composite video signal and for generating a first detection signal when a level of the first signal is greater than a first reference voltage;

a second level detector for separating a second signal from the input composite video signal and for generating a second detection signal when a level of the second signal is greater than a second reference voltage; and a logic circuit, coupled to the first and second level detectors, for outputting a third detection signal in response to the first and second detection signals, the third detection signal signifying a storage setting feasibility of a channel corresponding to the input composite video signal, wherein the first signal is a sync signal, and wherein the first level detector comprises:

a sync separator for separating the sync signal from the input composite video signal;

a sync signal level detector for detecting and outputting the level of the sync signal generated by the sync separator; and a first comparator for comparing the sync signal level output by the sync signal level detector with the first reference voltage and for generating the first detection signal when the sync signal level is greater than the first reference voltage.

10. A video signal level detector comprising:

a first level detector for separating a first signal from an input composite video signal and for generating a first detection signal when a level of the first signal is greater than a first reference voltage;

a second level detector for separating a second signal from the input composite video signal and for generating a second detection signal when a level of the second signal is greater than a second reference voltage; and a logic circuit, coupled to the first and second level detectors, for outputting a third detection signal in response to the first and second detection signals, the third detection signal signifying a storage setting feasibility of a channel corresponding to the input composite video signal, wherein the second signal is a color burst signal, and
wherein the second level detector comprises:
- a color signal separator for separating a color signal from the input composite video signal;
- a burst gate pulse generator;
- a color burst signal separator for separating the color burst signal from the color signal;
- a peak level detector for detecting and outputting the peak level of the color burst signal; and
- a second comparator for comparing the peak level of the color burst signal output by the peak level detector with the second reference voltage and for generating the second detection signal when the peak level of the color burst signal is greater than the second reference voltage.

11. A video signal level detector comprising:
- a first level detector for separating a first signal from an input composite video signal and for generating a first detection signal when a level of the first signal is greater than a first reference voltage;
- a second level detector for separating a second signal from the input composite video signal and for generating a second detection signal when a level of the second signal is greater than a second reference voltage; and
- a logic circuit, coupled to the first and second level detector, for outputting a third detection signal in response to the first and second detection signals, the third detection signal signifying a storage setting feasibility of a channel corresponding to the input composite video signal; and
- at least one circuit for adjusting magnitudes of the first and second reference voltages.

12. A video signal level detector comprising:
- a first level detector for separating a first signal from an input composite video signal and for generating a first detection signal when a level of the first signal is greater than a first reference voltage;
- a second level detector for separating a second signal from the input composite video signal and for generating a second detection signal when a level of the second signal is greater than a second reference voltage; and
- a logic circuit, coupled to the first and second level detectors, for outputting a third detection signal in response to the first and second detection signals, the third detection signal signifying a storage setting feasibility of a channel corresponding to the input composite video signal; and
- a processing circuit, coupled to the logic circuit, for performing at least one of a channel setting and a channel storage operation.

13. The video signal level detector as claimed in claim 12, wherein the processing circuit comprises a microcomputer.

14. The video signal level detector as claimed in claim 12, wherein the processing circuit stores a channel in response to receipt of the third detection signal.

* * * * *

UNITED STATES PATENT AND TRADEMARK OFFICE
CERTIFICATE OF CORRECTION

PATENT NO. : 5,982,451
DATED : November 9, 1999
INVENTOR(S) : Yun

It is certified that error appears in the above-identified patent and that said Letters Patent is hereby corrected as shown below:

Claim 11, line 12, change "detector" to --detectors--.

Signed and Sealed this

Fifteenth Day of May, 2001

Attest:

NICHOLAS P. GODICI

Attesting Officer     Acting Director of the United States Patent and Trademark Office